(12) United States Patent
Hu

(10) Patent No.: US 6,588,662 B1
(45) Date of Patent: Jul. 8, 2003

(54) PORTABLE DATA BACKUP DEVICE

(75) Inventor: Chia-Che Hu, Taipei (TW)

(73) Assignee: Loyalty Founder Enterprise Co., Ltd., Taoyuan (TW)

( * ) Notice: Subject to any disclaimer, the term of this patent is extended or adjusted under 35 U.S.C. 154(b) by 0 days.

(21) Appl. No.: 10/233,099

(22) Filed: Aug. 28, 2002

(51) Int. Cl.⁷ .............................................. G06K 7/08
(52) U.S. Cl. ...................................... 235/451; 235/492
(58) Field of Search ................................. 235/492, 451

(56) References Cited

U.S. PATENT DOCUMENTS 6,029,046 A * 2/2000 Khan et al. ................. 235/492

* cited by examiner

Primary Examiner—Harold I. Pitts
(74) Attorney, Agent, or Firm—Ladas & Parry

(57) ABSTRACT

A portable data backup device. The device has a flash memory reader to read digital data from a flash memory card, an input unit for producing a control signal, a backup unit for storing digital data, and a control unit coupled to the input unit. The device can read digital data from the flash memory card and store it to the backup unit after receiving the control signal.

18 Claims, 1 Drawing Sheet

PORTABLE DATA BACKUP DEVICE

BACKGROUND OF THE INVENTION

1. Field of the Invention

The present invention relates in general to a storage device. In particular, the present invention relates to a portable data backup device.

2. Description of the Related Art

Flash memory cards are popularly applied in digital cameras, notebook computers, MP3 players, PDAs and the like, but are is expensive. The portable consumer electrics device cannot store data when memory space within the portable consumer electrics device is full. At this time, data stored in the memory must be backed up or deleted. For example, if the memory space of a digital camera is full, the user must back up data to a computer host with a reading device such as a memory card reader or PC card.

Thus, users must carry several memory cards when away from the computer host to back up any significant amount of data. Furthermore, the price of memory cards is high.

SUMMARY OF THE INVENTION

It is an object of the present invention to provide a portable data backup device to back up digital data from a flash memory card to writeable media without requiring the presence of a computer host.

According to the above object, the portable data backup device of the present invention comprises a flash memory reader to read digital data from a flash memory card, an input unit for producing a control signal, a backup unit for storing digital data, and a control unit enabling the flash memory reader to read the digital data from the flash memory card and store it to the backup unit after receiving the control signal.

In the present invention, the portable data backup device further comprises a player unit to play or display the digital data stored in the flash memory card or in the backup unit.

DETAILED DESCRIPTION OF THE INVENTION

Figure 1:
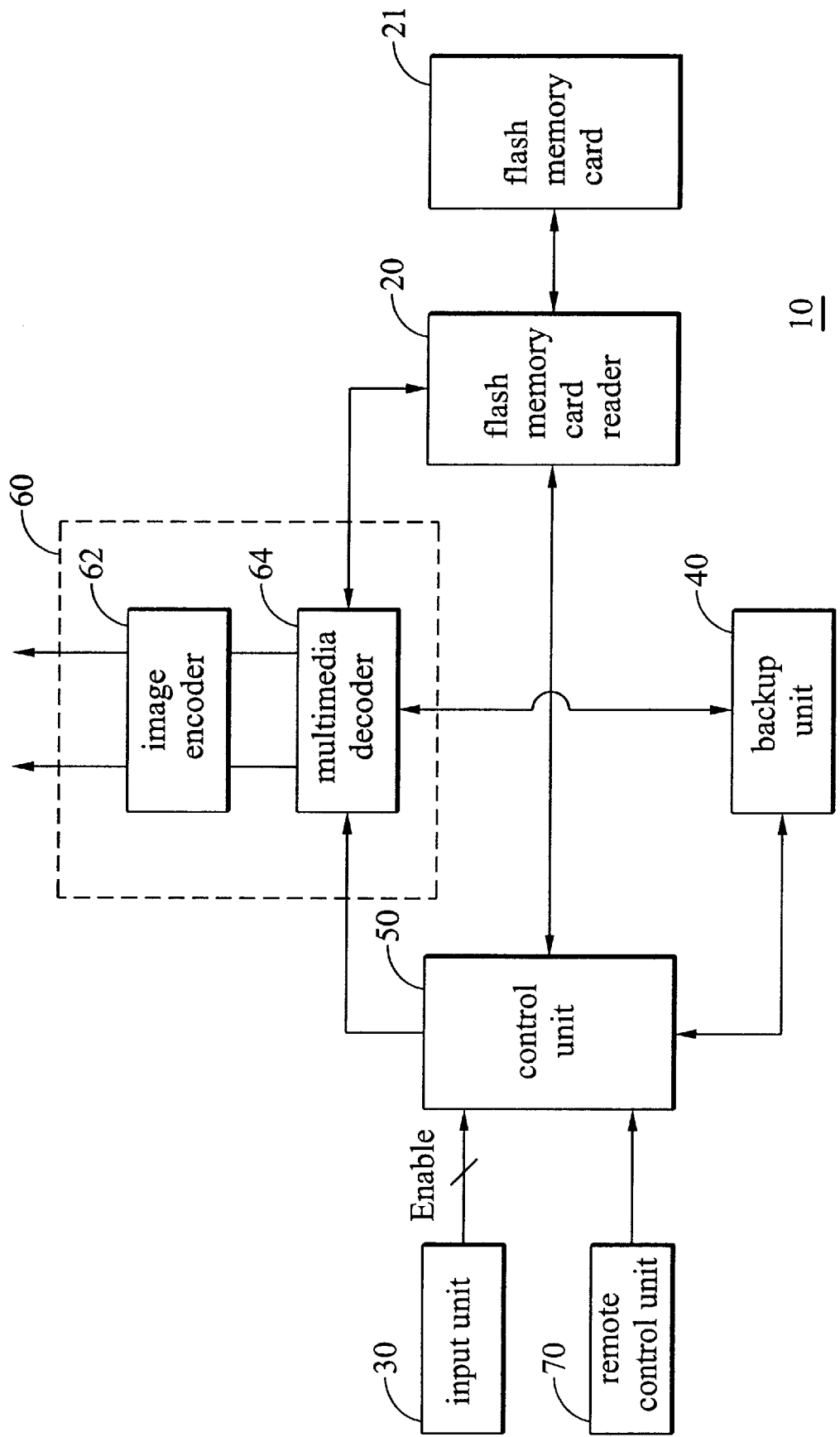
FIG. 1 is a diagram of the portable data backup device according to the present invention.

As shown in FIG. 1, a portable data backup device 10 has a flash memory reader 20 to read digital data from a flash memory card 21, an input unit 30 for producing an enabling control signal, a backup unit 40 for storing digital data, a control unit 50 coupled to the input unit 30, the flash memory reader 20 and the backup unit 40 enabling the flash memory reader 20 to read the digital data from the flash memory card 21 and then store it in the backup unit 40 after receiving the enabling control signal.

The flash memory reader 20 is a single or multi-port flash memory reader accepting or more flash memory cards to read the digital data stored thereon. The flash memory card 21 may be a compact flash memory card, multimedia card, secure digital memory card, smart memory card, memory stick or micro driver card, storing digital data such as audio files, MPEG files, MP3 music files or JPG photo files, and the like.

In the embodiment of the present invention, the input unit 30 is a key pad to produce an enabling control signal. The backup unit 40 is provided with an integrated drive electronics interface (IDE interface), and may be a CD-ROM, CD-R or RW, hard disk, DVD writer or combo drive.

The control unit 50 is a microprocessor enabling the flash memory reader 20 to read the digital data stored in the flash memory card 21 and then store the digital data into the backup unit 40 directly without using a personal computer.

Further, the portable data backup device 10 further has a player unit 20 coupled to the control unit 50 to play or display the digital data stored in the flash memory card 21 or in the backup unit 40. The player unit 20 has a multimedia decoder 64 coupled to the control unit by a RS232 interface and an image encoder 62 coupled to the multimedia decoder 64. For example the multimedia decoder 64 can decode MP3 music files stored in the flash memory card 21 or in the backup unit 40 into audio signals to output to a speaker or the like. Additionally, the portable data backup device 10 of the present invention can play or display music files as recordable media player or a MP3 player.

The image encoder 62 is coupled to the multimedia decoder 64 to encode the decoded digital data therefrom and output it to a display. For example, the image encoder 62 encodes MPEG files or JPG files which decoded by the multimedia decoder 64 into video signals to a LCD, TV, or CRT monitor.

The portable data backup device 10 further has a remote control unit 70 and a universal serial bus (USB) interface coupled to the control unit 50. The portable data backup device 10 can also connect to an external computer host by the universal serial bus interface such that the external computer host can play or display and read the digital data stored in the flash memory card 21 and backup unit 40. The remote control unit 70 controls the player unit 60 to play or display the digital data stored in the flash memory card or in the backup unit 40 remotely.

In the portable data backup device of the present invention, when a flash memory card 21 is put into the flash memory reader 20 and an enabling control signal is input through the input unit by user, control unit 50 reads the digital data from the flash memory card 21 and writes into the back up according to the enabling control signal. Consequently, the portable data backup device of the present invention can back up the digital data stored in a flash memory into recordable media when the user cannot use a computer host. Moreover, the present invention can back up digital data stored in a flash memory card without any computer apparatus or additional flash memory cards, thereby increasing convenience. Further, the enabling control signal from the control unit 50 enables the player unit 60 to play or display stored files.

The control unit 50 also allows integration of JPG files and audio files into MPEG form. As well, the control unit 50 can integrate background sounds into the audio files. The control unit 50 of the digital backup device further can display the integrated files in a predetermined manner. If the audio files are set to be displayed one at a time, the images are switched by the remote control unit 70. The control unit 50 can further set the switching time between files displayed continuously. The present invention can also rotate and zoom on the images with the remote control unit 70.

The present invention can integrate JPG image files and audio files into MPEG form and back up the new files to recordable media without requiring any computer apparatus, and the written files can be played or displayed in any of the conventional ways.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A portable data backup device, comprising:
   a flash memory reader to readdigital data from a flash memory card;
   an input unit for producing a control signal;
   a backup unit for storing digital data; and
   a control unit coupled to the input unit, the flash memory reader and the backup unit enabling the flash memory reader to read the digital data from the flash memory card and store it to the backup unit after receiving the control signal.

2. The portable data backup device as claimed in claim 1, further comprising a player unit coupled to the control unit for play or displaying the digital data stored in the flash memory card or in the backup unit.

3. The portable data backup device as claimed in claim 2, further comprising a unit enabling remote control of the player unit to play or display the digital data stored in the flash memory card or in the backup unit.

4. The portable data backup device as claimed in claim 2, wherein the player unit composes:
   a multimedia decoder coupled to the control unit for decoding the digital data stored in the flash memory card and backup unit; and
   an image encoder coupled to the multimedia decoder to encode the decoded digital data from the multimedia decoder to image data.

5. The portable data backup device as claimed in claim 4, wherein the multimedia decoder is coupled to the control unit by a RS232 interface.

6. The portable data backup device as claimed in claim 1, further comprising a USB interface for connection to an external computer host.

7. The portable data backup device as claimed in claim 1, wherein the control unit further reads the digital data from the flash memory card, performing conversion of same into MPEG form and subsequent storage in the backup unit.

8. The portable data backup device as claimed in claim 7, wherein the control unit further adds background audio effects to the converted digital data in MPEG form.

9. The portable data backup device as claimed in claim 1, wherein the digital data is audio data.

10. The portable data backup device as claimed in claim 1, wherein the digital data is MPEG data.

11. The portable data backup device as claimed in claim 1, wherein the digital data is MP3 data.

12. The portable data backup device as claimed in claim 1, wherein the digital data is JPG data.

13. The portable data backup device as claimed in claim 1, wherein the flash memory card is a compact flash card, multimedia card, secure digital memory, smart memory card, memory stick, or micro driver card.

14. The portable data backup device as claimed in claim 1, wherein the backup unit is a CD writing device.

15. The portable data backup device as claimed in claim 1, wherein the backup unit is a hard disk.

16. The portable data backup device as claimed in claim 1, wherein the backup unit is a DVD writer.

17. The portable data backup device as claimed in claim 1, wherein the backup unit is a combo driver.

18. The portable data backup device as claimed in claim 1, wherein the control unit is coupled to the backup unit by an IDE interface.

* * * * *